(12) United States Patent
Maalioune et al.

(10) Patent No.: US 12,404,013 B2
(45) Date of Patent: Sep. 2, 2025

(54) SYSTEM FOR MANAGING THE DECELERATION OF AN AIRCRAFT ON A RUNWAY ON THE GROUND AND ASSOCIATED METHOD

(71) Applicants: SAFRAN AIRCRAFT ENGINES, Paris (FR); SAFRAN ELECTRONICS & DEFENSE, Boulogne-Billancourt (FR); SAFRAN LANDING SYSTEMS, Velizy-Villacoublay (FR); SAFRAN NACELLES, Gonfreville-l'Orcher (FR)

(72) Inventors: Hakim Maalioune, Moissy-Cramayel (FR); Laurent Christian Vincent Roger Miralles, Moissy-Cramayel (FR); Christophe Bastide, Moissy-Cramayel (FR); Jérémy Edmond Fert, Moissy-Cramayel (FR); Vincent Hupin, Moissy-Cramayel (FR)

(73) Assignees: SAFRAN AIRCRAFT ENGINES, Paris (FR); SAFRAN ELECTRONICS & DEFENSE, Boulogne-Billancourt (FR); SAFRAN LANDING SYSTEMS, Velizy Villacoublay (FR); SAFRAN NACELLES, Gonfreville-l'Orcher (FR)

( * ) Notice: Subject to any disclaimer, the term of this patent is extended or adjusted under 35 U.S.C. 154(b) by 203 days.

(21) Appl. No.: 17/913,386
(22) PCT Filed: Mar. 18, 2021
(86) PCT No.: PCT/FR2021/050446
§ 371 (c)(1),
(2) Date: Sep. 21, 2022
(87) PCT Pub. No.: WO2021/191530
PCT Pub. Date: Sep. 30, 2021

(65) Prior Publication Data
US 2023/0137045 A1    May 4, 2023

(30) Foreign Application Priority Data
Mar. 27, 2020 (FR) ...................... 2003016

(51) Int. Cl.
*B64C 25/42* (2006.01)
*B64C 19/02* (2006.01)
(Continued)

(52) U.S. Cl.
CPC ............ *B64C 25/426* (2013.01); *B64C 19/02* (2013.01); *G08G 5/25* (2025.01); *G08G 5/26* (2025.01)

(58) Field of Classification Search
CPC ....... B64C 25/426; B64C 19/02; B64C 19/00; G08G 5/0008; G08G 5/0013; Y02T 50/80
See application file for complete search history.

(56) References Cited

U.S. PATENT DOCUMENTS 10,049,590 B2 * 8/2018 Thiele ...................... G08G 5/21
10,131,442 B2 * 11/2018 Waltner .................. B64C 27/04
(Continued)

FOREIGN PATENT DOCUMENTS

| EP | 0 895 929 A2 | 2/1999 |
|----|--------------|--------|
| EP | 2 514 647 A2 | 10/2012 |

(Continued)

OTHER PUBLICATIONS

International Search Report as issued in International Patent Application No. PCT/FR2021/050446, dated May 26, 2021.

*Primary Examiner* — Frederick M Brushaber
(74) *Attorney, Agent, or Firm* — Pillsbury Winthrop Shaw Pittman LLP

(57) ABSTRACT

A system for managing the deceleration of an aircraft enabling the control in real time of the position of the aircraft on a braking axis, includes a braking system; a calculator configured to: calculate, from aircraft data and from external data, a sequence of use of the braking system intended to brake the aircraft over a predetermined braking distance which associates a predetermined position on the braking (Continued)

axis with each braking instant; update in real time the sequence of use as a function of the difference between the position of the aircraft and the predetermined position; and a controller configured to control the braking system as a function of the sequence of use.

13 Claims, 3 Drawing Sheets

(51) Int. Cl.
*G08G 5/25* (2025.01)
*G08G 5/26* (2025.01)

(56) References Cited

U.S. PATENT DOCUMENTS

| | | | | |
|---|---|---|---|---|
| 10,202,204 | B1* | 2/2019 | Daidzic | G08G 5/22 |
| 11,409,282 | B2* | 8/2022 | Suzuki | B64D 13/00 |
| 11,724,820 | B2* | 8/2023 | Sellmann | G08G 5/34 |
| | | | | 701/16 |
| 2008/0249675 | A1* | 10/2008 | Goodman | B64C 25/426 |
| | | | | 701/16 |
| 2009/0043434 | A1* | 2/2009 | Deker | G05D 1/0676 |
| | | | | 701/16 |
| 2010/0079308 | A1* | 4/2010 | Fabre | G08G 5/76 |
| | | | | 340/951 |
| 2010/0204909 | A1* | 8/2010 | Gayraud | G05D 1/0083 |
| | | | | 701/120 |
| 2017/0183086 | A1* | 6/2017 | Le-Bouedec | G08G 5/54 |
| 2022/0009651 | A1* | 1/2022 | Lampazzi | B64D 45/00 |
| 2023/0137045 | A1* | 5/2023 | Maalioune | B64C 19/00 |
| | | | | 701/3 |
| 2023/0368683 | A1* | 11/2023 | Maalioune | G08G 5/21 |

FOREIGN PATENT DOCUMENTS

| | | |
|---|---|---|
| FR | 2 936 079 A1 | 3/2010 |
| WO | WO 02/47977 A1 | 6/2002 |

* cited by examiner

SYSTEM FOR MANAGING THE DECELERATION OF AN AIRCRAFT ON A RUNWAY ON THE GROUND AND ASSOCIATED METHOD

CROSS-REFERENCE TO RELATED APPLICATIONS

This application is the U.S. National Stage of PCT/FR2021/050446, filed Mar. 18, 2021, which in turn claims priority to French patent application number 2003016 filed Mar. 27, 2020. The content of these applications are incorporated herein by reference in their entireties.

TECHNICAL FIELD OF THE INVENTION

The technical field of the invention is that of aircraft and more particularly that of systems for managing the deceleration of an aircraft on a runway on the ground.

The present invention relates to a system for managing the deceleration of an aircraft on a runway on the ground and in particular a system for managing the deceleration of an aircraft on a runway on the ground enabling the control in real time of the position of the aircraft on a braking axis of the runway. The present invention also relates to a control method implemented by the system.

TECHNOLOGICAL BACKGROUND OF THE INVENTION

Aircraft runway overruns are numerous, of the order of one runway overrun a month in the world, and are due, in around 25% of cases, to a poor piloting choice during a landing in degraded meteorological conditions.

Faced with this, the aeronautical authorities require solutions to be put in place to reduce the number of runway overruns, and in particular the number of longitudinal runway overruns.

Longitudinal runway overruns are linked to poor management of the braking means making it possible to brake the aircraft, when the conditions at the level of the runway are degraded.

At present, the different braking means are managed independently of one another and manually by the pilot, since all the braking means are not automated and since the automated braking means are not automated in a compatible manner.

Thus, it is the pilot who has to manage the configuration of each of the braking means. The risk of longitudinal runway overruns in the case of degraded meteorological conditions is thus high since the management of the braking means is entirely based on the pilot and his experience.

There thus exists a need for a system making it possible to manage the braking means of an aircraft in deceleration phase to limit the risk of a longitudinal runway overrun.

SUMMARY OF THE INVENTION

The invention offers a solution to the aforementioned problems, by proposing a system for managing the deceleration of an aircraft limiting the risk of longitudinal runway overruns.

A first aspect of the invention relates to a system for managing the deceleration of an aircraft on a runway on the ground enabling the control in real time of the position of the aircraft on a braking axis of the runway, comprising:
  Braking means configured to brake the aircraft;
  A calculator configured to:
    Calculate, from aircraft data and from external data comprising data on the state of the runway and meteorological data on the ground, a sequence of use of the braking means intended to brake the aircraft along the braking axis over a predetermined braking distance associated with a predetermined braking duration comprising a plurality of braking instants each associated with a predetermined position on the braking axis;
    Update in real time the sequence of use as a function of the difference, along the braking axis, between the position of the aircraft and the predetermined position associated with a given braking instant or the occurrence of a given event;
  Control means configured to control the braking means as a function of the sequence of use or an instruction sent by a runway overrun alert system of the aircraft.

Thanks to the invention, the calculator calculates a sequence of use of the braking means making it possible to brake the aircraft over a predetermined braking distance along a braking axis of the runway and which takes into account, on the one hand, the data of the aircraft and, on the other hand, the data relative to the state of the runway and to the meteorological conditions on the ground. The sequence of use is next updated when a difference along the braking axis between the position of the aircraft and the predetermined position for a given braking instant is noted, due for example to a difference between the external data used for the calculation and the real external data. This updating is carried out in real time, that is to say at very close instants, so that the difference does not have the time to be accentuated in such a way that it would no longer be possible to correct the position of the aircraft along the braking axis before a longitudinal runway overrun. The braking means are controlled by the control means according to the sequence of use in the nominal case or according to an alert instruction coming from a runway overrun alert system in an emergency.

Apart from the characteristics that have been set out in the preceding paragraph, the system according to a first aspect of the invention may have one or more complementary characteristics among the following, considered individually or according to all technically possible combinations thereof.

According to an alternative embodiment, the braking means comprise a plurality of thrust reversers each equipped on an engine of the aircraft and a plurality of landing gears each comprising at least one wheel.

According to a sub-alternative embodiment compatible with the preceding alternative embodiment, the braking means further comprise a plurality of air brakes each equipped on a wing of the aircraft.

According to a first embodiment compatible with the preceding alternative embodiment, the control means comprise a single central controller.

Thus, the central controller is configured to control each braking means as a function of the sequence of use or an instruction. The number of calculators and thus the mass of the control means is minimised, which notably makes it possible to limit fuel consumption.

According to a second embodiment compatible with the preceding alternative embodiment, the control means comprise a central controller and a controller per braking means or per type of braking means.

Thus, each controller is configured to control a single braking means, for example a given thrust reverser, or a single type of braking means, for example all of the thrust reversers, and the central controller is configured to control each of the controllers as a function of the sequence of use or an instruction. It thus suffices to equip existing aircraft with a central calculator in order that the control system is implemented.

According to an alternative embodiment compatible with the preceding alternatives and embodiments, the aircraft comprises engines and in that the aircraft data comprise the speed of the aircraft and/or data of availability of the braking means and/or data of use of the engines.

Thus, the calculation of the sequence of use takes into account the current speed of the aircraft and the future speed of the aircraft, through information on the braking means which could be used and the use of the engines, and thus the level of deceleration of the aircraft.

According to a sub-alternative embodiment of the preceding alternative embodiment, the data of availability of a braking means comprise data relative to the state of the braking means and/or data relative to the cost of use of the braking means.

Thus, the calculation of the sequence of use takes into account the operating capacity of each braking means and/or its cost of use, for example through the wear that the use causes on the braking means and/or the consumption of fuel brought about by the use of the braking means.

According to an alternative embodiment compatible with the preceding alternatives and embodiments, the system comprises first communication means configured to communicate with a station on the ground.

Thus, the system can obtain external data from the control tower in charge of take offs and landings on the runway, in accordance with regulations.

According to an alternative embodiment compatible with the preceding alternatives and embodiments, the system comprises second communication means configured to communicate with at least one other aircraft.

Thus, the calculator can use sequences of use calculated by other aircraft having previously landed or taken off on the runway and having been transmitted to it to calculate the sequence of use.

A second aspect of the invention relates to a method for controlling in real time the position of an aircraft on a braking axis of a runway on the ground implemented by the system according to the first aspect of the invention, comprising the following steps:

Calculating, by the calculator, from aircraft data and from external data comprising data on the state of the runway and meteorological data on the ground, a sequence of use of the braking means intended to brake the aircraft along the braking axis over a predetermined braking distance associated with a predetermined braking duration comprising a plurality of braking instants each associated with a predetermined position on the braking axis;

If, at a given braking instant, the difference along the braking axis, between the position of the aircraft and the predetermined position, is above a threshold or if a given event occurs, updating, by the calculator, of the sequence of use;

Implementing the sequence of use of the braking means by the control means.

Thus, the sequence of use is updated when the difference between the position of the aircraft and the predetermined position on the braking axis becomes greater than a threshold value at a given braking instant.

According to an alternative embodiment, the sequence of use is implemented automatically or manually.

Thus, the pilot may choose to implement the sequence of use himself.

According to an alternative embodiment compatible with the preceding alternative embodiment, the sequence of use is calculated in flight.

Thus, if the calculator does not manage to calculate a sequence of use corresponding to the predetermined braking distance, for example because the predetermined braking distance is too short given the speed of the aircraft and its braking means, the calculator can trigger an instruction for rejection of landing or take off.

A third aspect of the invention relates to a computer product-programme comprising instructions which, when they are executed by a computer, lead said computer to implement the steps of the method according to the second aspect of the invention.

A fourth aspect of the invention relates to a recording support readable by a computer comprising instructions which, when they are executed by a computer, lead said computer to implement the steps of the method according to the second aspect of the invention.

The invention and the different applications thereof will be better understood on reading the description that follows and by examining the figures that accompany it.

BRIEF DESCRIPTION OF THE FIGURES

The figures are presented for indicative purposes and in no way limit the invention.

DETAILED DESCRIPTION

Unless stated otherwise, a same element appearing in the different figures has a single reference.

A first aspect of the invention relates to a system for managing the deceleration of an aircraft on a runway on the ground enabling the control in real time of the position of the aircraft on a braking axis of the runway on the ground.

The objective of the invention is to avoid an aircraft runway overrun, more particularly during the landing of the aircraft. The control system thus makes it possible to stop the aircraft before it overruns the runway, that is to say to respect a predetermined braking distance along a braking axis comprised in the runway.

"Braking distance" is taken to mean the distance travelled by the aircraft along a braking axis, between its landing on the runway and its stoppage on the runway, that is to say the distance travelled by the aircraft for a braking duration comprising a plurality of braking instants comprised between the instant at which the aircraft lands on the runway and the instant at which the aircraft stops on the runway.

The invention may also be implemented in the case of a rejection of take off, for example when the aircraft does not have sufficient speed to take off and has to brake urgently to prevent a runway overrun. The braking distance is then the distance travelled by the aircraft between the instant at which at least one first braking means is activated and the instant at which the aircraft stops on the runway.

The predetermined braking distance is the distance travelled by the aircraft along a braking axis, for a predetermined braking duration comprising a plurality of instants each associated with a predetermined position on the braking axis corresponding to the position at which the aircraft should be at the given braking instant in order that the aircraft stops at the predetermined braking distance.

Figure 5:
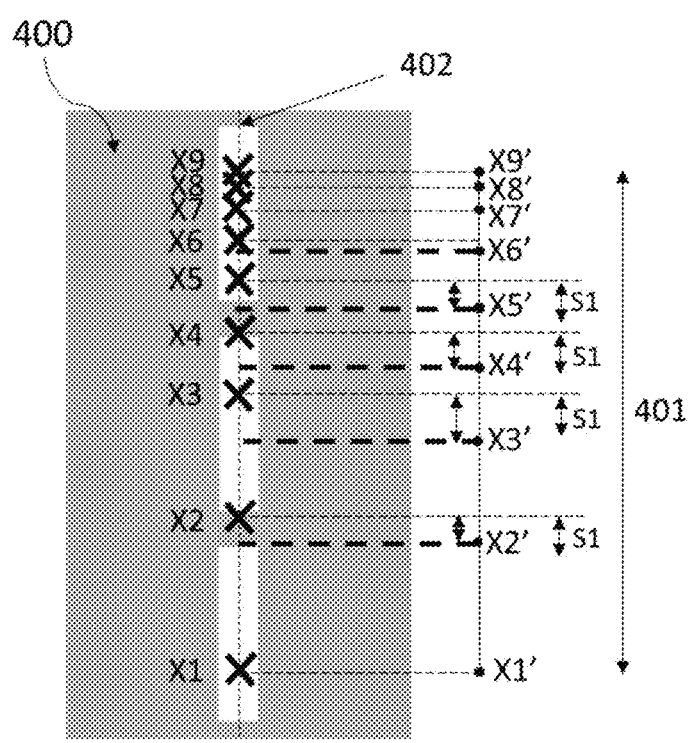
FIG. 5 shows a schematic representation of the position at several instants of an aircraft equipped with the control system, on a braking axis of a runway.

FIG. 5 shows a schematic representation of the position at several braking instants, of an aircraft equipped with the control system, over a braking axis 402 on a runway 400.

In FIG. 5, the predetermined braking distance 401 is along a longitudinal braking axis 402 passing through the middle of the runway 400 and is associated with a braking duration comprising 9 braking instants, each corresponding to a predetermined position X1', X2', X3', X4', X5', X6', X7', X8', X9' on the braking axis 402.

In the case of landing, the predetermined braking distance 401 is for example the distance between the landing point of the aircraft on the runway 400 and the distance corresponding to a given percentage of the runway 400, such as for example three quarters of the runway 400 or seven eighths of the runway 400.

The predetermined braking distance 401 may also depend on the state of the runway 400, for example zones being able to influence the braking of the aircraft, such as zones having hollows or bumps liable to slow down the aircraft or instead the coefficient of friction of the runway 400 supplied by a control tower on the ground.

The predetermined braking distance 401 is for example determined from performance abacuses of the aircraft 100 giving a braking distance as a function of the configuration of the braking means.

"Control in real time of the position of the aircraft on a braking axis" is taken to mean that the data relative to the position of the aircraft are processed immediately after their acquisition, and that the duration between the acquisition of the position data and the production of control instructions making it possible to adjust the real position of the aircraft on the predetermined position at a given braking instant is reduced to the minimum. The duration is for example of the order of 2.5 to 20 ms.

Figure 2:
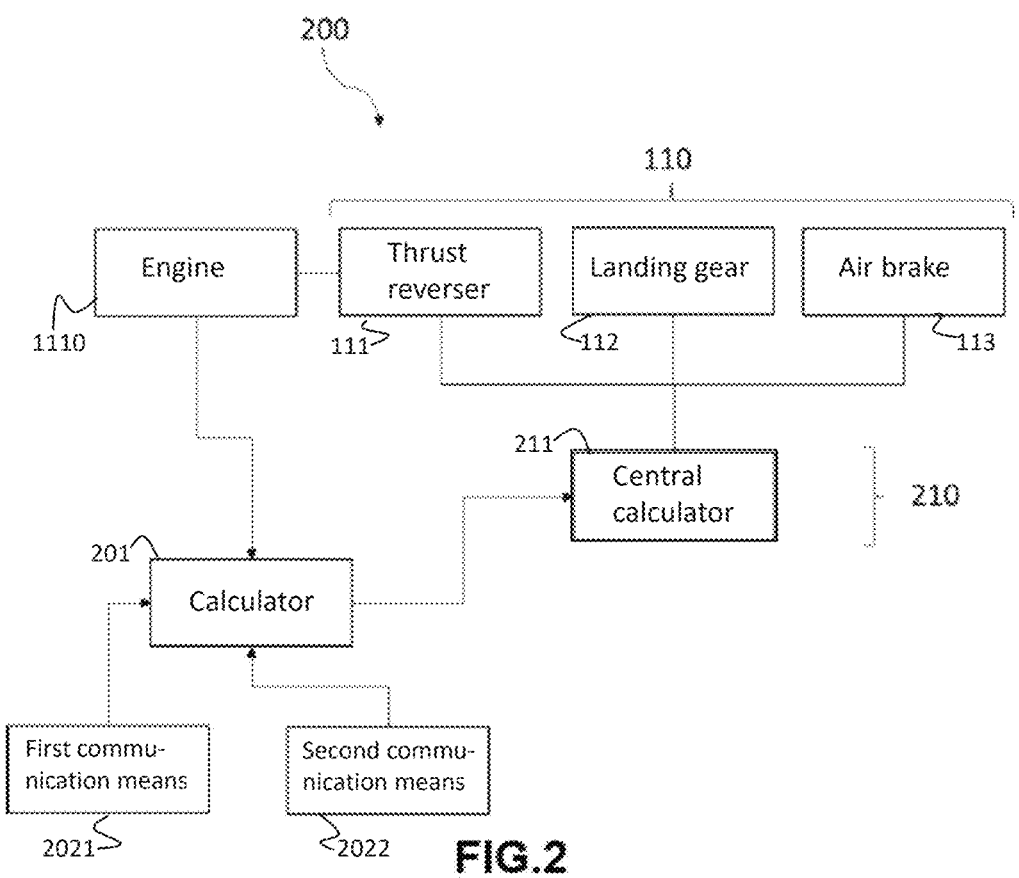
FIG. 2 shows a schematic representation of the control system according to the first embodiment.

FIG. 2 shows a schematic representation of the control system 200 according to a first embodiment.

Figure 3:
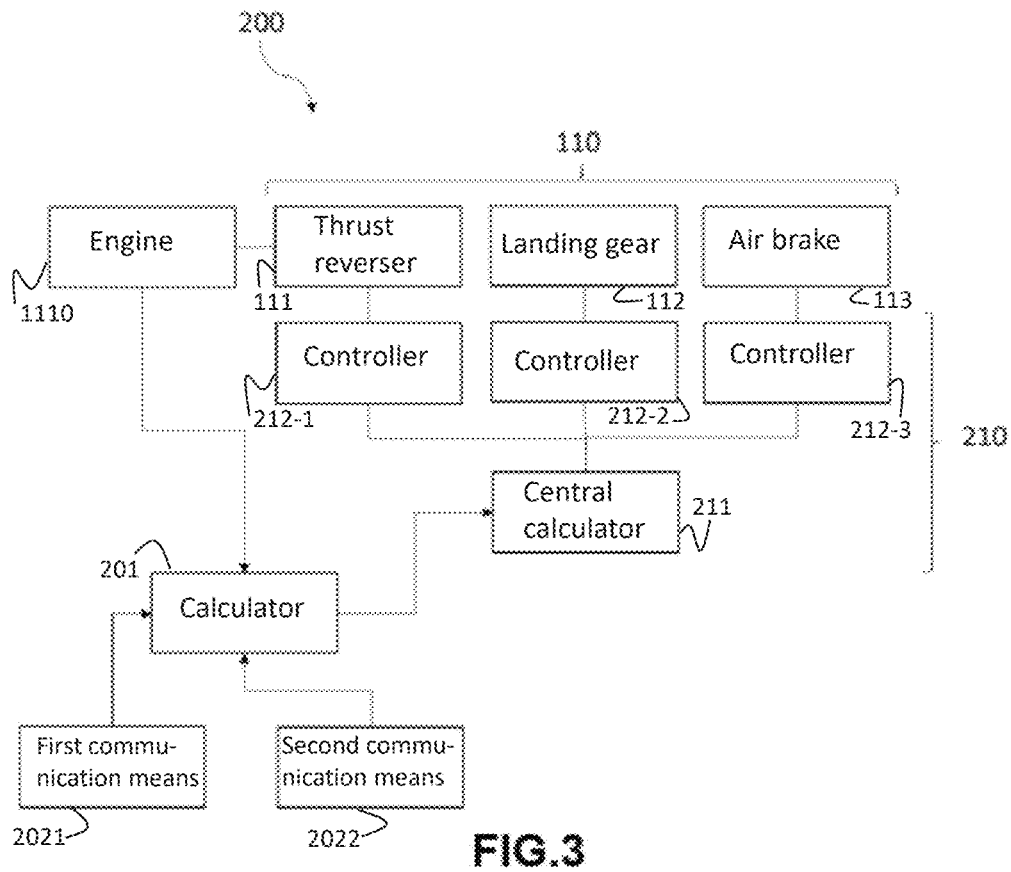
FIG. 3 shows a schematic representation of the control system according to the second embodiment.

FIG. 3 shows a schematic representation of the control system 200 according to a second embodiment.

As illustrated in FIG. 2, the control system 200 comprises:
Braking means 110;
A calculator 201;
Control means 210 comprising at least one central calculator 211.

The braking means 110 are configured to brake the aircraft, that is to say to decrease the speed of the aircraft.

Figure 1:
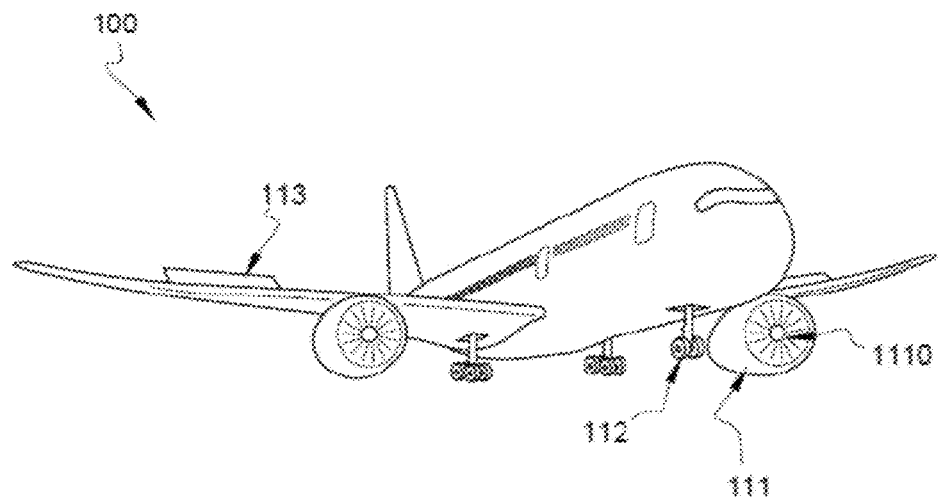
FIG. 1 shows a schematic representation of an aircraft.

FIG. 1 shows a schematic representation of an aircraft 100.

As illustrated in FIG. 1, the braking means 110 comprise a plurality of thrust reversers 111 and a plurality of landing gears 112. The aircraft 100 comprises a plurality of engines 1110. Each thrust reverser is mounted on an engine 1110 but each engine 1110 is not necessarily equipped with a thrust reverser 111. The landing gear 112 comprises at least one wheel.

The aircraft 100 then comprises a first type of braking means 110 corresponding to the thrust reversers 111 and a second type of braking means 110 corresponding to the landing gears 112.

The braking means 110 may also comprise a plurality of air brakes 113, as in FIG. 1, each wing of the aircraft 100 being equipped with at least one air brake 113.

The aircraft 100 then further comprises a third type of braking means 110 corresponding to the air brakes 113.

The calculator 201 is configured to calculate a sequence of use of the braking means 110 making it possible to brake the aircraft 100 over the predetermined braking distance 401.

"Sequence of use of the braking means 110" is taken to mean an ordered series of use of the braking means 110 comprising the activation/deactivation of the different braking means 110 and their characteristics of use, such as for example the use power for the thrust reversers 111, the level of deceleration for the landing gears 112 or the angle for the air brakes 113.

If the example is taken of an aircraft 100 landing at one end of a runway 400 and parking at the other end of the runway 400, the sequence of use comprises for example, between the landing point of the aircraft 100 and the middle of the runway 400, the use of thrust reversers 111 with a given first power and air brakes 113 according to a given angle, then, between the middle of the runway and the parking point, the use of the landing gears 112 with a given level of deceleration and the thrust reversers 111 with a given second power.

The sequence of use is for example calculated in flight before landing or at the moment of landing of the aircraft 100, during the first contact between the runway 400 and the aircraft 100.

The sequence of use is for example calculated on the ground at the moment of take off.

In the case where the sequence of use is calculated in flight, if the calculator 201 does not manage to calculate a sequence of use which does not lead to a runway overrun of the aircraft 100, for example because the predetermined braking distance 401 is too short given the speed of the aircraft 100 and/or the braking means 110 of the aircraft 100, the calculator 201 can generate an alert advising the pilot not to land.

The sequence of use is calculated from aircraft data, that is to say data relative to the aircraft, and external data, that is to say data relative to conditions external to the aircraft 100.

The external data comprise data relative to the state of the runway 400, for example the coefficient of friction of the runway 400, and data relative to the meteorological conditions at the level of the runway 400, for example the force and the direction of the wind.

The external data are for example obtained from a control tower on the ground in charge of the runway 400. In this case, the system 200 comprises first communication means 2021 making it possible to communicate with the control tower and generally speaking with a station on the ground.

The aircraft data comprise for example the speed of the aircraft 100, data relative to the availability of the braking means 110, for example if a given braking means 110 is out of order or operational and/or data relative to the use by the aircraft 100 of its engines 1110, for example the power delivered by each engine 1110.

The data relative to the availability of a certain braking means 110 comprise data relative to the state of the braking means 110, for example if the braking means 110 are operational or are out of order or instead the level of wear of the braking means 110, and/or data relative to the cost of use of the braking means 110, for example the consumption of fuel linked to the use of the braking means 110 or instead the cost of replacing the braking means 110.

The choice of the aircraft data used to calculate the sequence of use is for example made by the pilot or by the airline company.

The sequence of use may also be calculated from data coming from other aircraft 100, for example aircraft 100 having already landed on the runway 400. In this case, the system 200 comprises second communication means 2022 making it possible to communicate with other aircraft 100.

The calculator 201 is also configured to update the sequence of use in real time as a function of the difference between the position of the aircraft 100 and the predetermined position 401 along the braking axis 402 at a given braking instant.

For example, if the example developed previously is reconsidered, if a wind pushes the aircraft 100 forwards with an intensity above the provided for intensity, that is to say above the intensity that had been used to calculate the sequence of use, the sequence of use is for example updated to compensate for the intensity of the wind, for example by increasing the power of the thrust reversers 111.

The calculator 201 is also configured to update the sequence of use as a function of a given event. The event is for example the breakdown of a braking means 110 used in the sequence of use, or instead the breakdown of an engine 1110.

The control means 210 are configured to control the braking means 110 as a function of the sequence of use or an instruction coming from a runway overrun alert system.

The runway overrun alert system is for example a ROAAS (Runway Overrun Alert and Awareness System) equipped on the aircraft 100.

The instruction is for example to implement a maximum braking sequence when a danger has been detected.

According to the first embodiment of the system 200 illustrated in FIG. 2, the control means 210 comprise a single central controller 211 configured to control all of the braking means 110.

According to the second embodiment of the system 200, the control means 210 comprise a central controller 211 and a controller 212 per braking means 110 or per type of braking means 110 configured to control the braking means or the type of braking means on instruction of the central controller 211.

In FIG. 3, the control means 210 comprise a central controller 211, a controller 212-1 configured to control the thrust reversers 111, a controller 212-2 configured to control the landing gears 112 and a controller 212-3 configured to control the air brakes 113.

A second aspect of the invention relates to a method for controlling in real time the position of the aircraft on the braking axis 402 implemented by the system 200 according to the first aspect of the invention.

Figure 4:
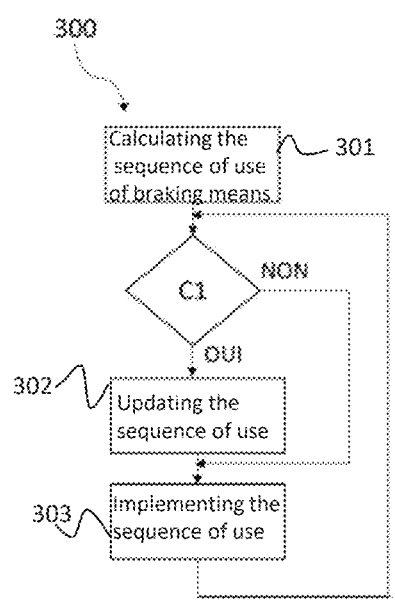
FIG. 4 is a block diagram illustrating the steps of the control method.

FIG. 4 is a block diagram illustrating the steps of the method 300 according to the second aspect of the invention.

A first step 301 of the method 300 implemented by the calculator 201, consists in calculating the sequence of use of the braking means 110 as a function of aircraft data and external data.

If, for a braking instant of the predetermined braking duration, a first condition C1 is realised, that is to say if the difference along the braking axis 402, between the position X1, X2, X3, X4, X5, X6, X7, X8, X9 of the aircraft 100 and the predetermined position X1', X2', X3', X4', X5', X6', X7', X8', X9' associated with the braking instant is above a threshold S1, a second step 302 of the method 300 is realised.

If the first condition C1 is not realised, a third step 303 of the method is realised.

The threshold S1 is chosen in such a way that it is still possible to correct the position of the aircraft 100 on the braking axis 402 before a longitudinal runway overrun.

The threshold S1 is for example the value zero.

The second step 302 of the method 300 implemented by the calculator 201, consists in updating the sequence of use. Thus, if for example, at a given braking instant, the position X1, X2, X3, X4, X5, X6, X7, X8, X9 of the aircraft 100 is further on the runway than the predetermined position X1', X2', X3', X4', X5', X6', X7', X8', X9', for example because the intensity of the wind pushing the aircraft 100 forwards has been underestimated, the sequence of use is updated to brake the aircraft 100 more.

The second step 302 of the method 300 is followed by the third step 303.

A third step 303 of the method 300 implemented by the control means 210, consists in implementing the sequence of use on the braking means 110.

The implementation of the sequence of use of the braking means 110 may be carried out automatically or manually by the pilot of the aircraft 100.

In the case where the implementation is manual, indications could be provided to assist the pilot.

An exemplary embodiment is illustrated in FIG. 5. The position of an aircraft 100 along the braking axis 402 is represented therein at several instants, a point Xi corresponding to a position of the aircraft 100 at a given instant.

In FIG. 5, the aircraft 100 lands at a point X1 of the runway 400. The sequence of use of the braking means 100 has been calculated in flight to enable the aircraft 100 to brake over the predetermined braking distance 401.

At each instant, it is verified if the first condition C1 is realised. At the instant corresponding to the point X2, the difference between the position X2 of the aircraft 100 and the predetermined position X2' along the braking axis 402 is below the threshold S1. The sequence of use is thus not updated and the control means 210 thus implement the sequence of use calculated in flight.

At the instant corresponding to the point X3, the difference along the braking axis 402 between the position X3 of the aircraft 100 and the predetermined position X3' is above the threshold S1. The sequence of use is thus updated. From the instant corresponding to the point X4, the control means 210 implement the sequence of use updated at point X3.

Up to the instant corresponding to the point X9, parking point, the difference along the braking axis 402 between the position X4, X5, X6, X7, X8, X9 of the aircraft 100 and the predetermined position X4', X5', X6', X7', X8', X9' is below the threshold S1 and the sequence of use is thus not updated between the instant corresponding to the point X3 and the parking of the aircraft 100.

The invention claimed is:

1. A system for managing a deceleration of an aircraft on a runway on the ground enabling a control in real time of a position of the aircraft on a braking axis of the runway, comprising:
 a braking system configured to brake the aircraft;
 a calculator configured to:
  calculate, from aircraft data and from external data comprising data on a state of the runway and meteorological data on the ground, a sequence of use of the braking system of the aircraft on the ground intended to brake the aircraft along the braking axis, over a predetermined braking distance associated with a predetermined braking duration comprising a plurality of braking instants each associated with a predetermined position on the braking axis, the sequence of use of the braking system being defined as an ordered series of use of the braking system between a landing point and a parking point of the aircraft, comprising activation/deactivation of the braking system and its characteristics of use;

update in real time, the sequence of use as a function of the difference, along the braking axis, between the position of the aircraft and the predetermined position associated with a given braking instant, or the occurrence of a given event;

a controller configured to control the braking system as a function of the sequence of use or an instruction sent by a runway overrun alert system of the aircraft.

2. The system according to claim 1, wherein the braking system comprises a plurality of thrust reversers each equipped on an engine of the aircraft and a plurality of landing gears each comprising at least one wheel.

3. The system according to claim 2, wherein the braking system further comprises a plurality of air brakes each equipped on a wing of the aircraft.

4. The system according to claim 1, wherein the controller comprises a single central controller.

5. The system according to claim 1, wherein the controller comprises a central controller and a controller per braking system or per type of braking system.

6. The system according to claim 1, wherein the aircraft comprises engines and wherein the aircraft data comprises a speed of the aircraft and/or data of availability of the braking system and/or data of use of the engines.

7. The system according to claim 6, wherein the data of availability of a braking system comprises data relative to the state of the braking system and/or data relative to the cost of use of the braking system.

8. The system according to claim 1, further comprising first communication means configured to communicate with a station on the ground.

9. The system according to claim 1, further comprising second communication means configured to communicate with at least one other aircraft.

10. A method for controlling in real time a position of an aircraft on a braking axis of a runway on the ground implemented by a system for managing a deceleration of the aircraft on the runway enabling a control in real time of said position of the aircraft, the system including a braking system configured to brake the aircraft, a calculator and a controller configured to control the braking system, the method comprising:

calculating, by the calculator, from aircraft data and from external data comprising data on the state of the runway and meteorological data on the ground, a sequence of use of the braking system of the aircraft on the ground intended to brake the aircraft along the braking axis, over a predetermined braking distance associated with a predetermined braking duration comprising a plurality of braking instants each associated with a predetermined position on the braking axis, the sequence of use of the braking system being defined as an ordered series of use of the braking system between a landing point and a parking point of the aircraft, comprising activation/deactivation of the braking system and its characteristics of use;

when, at a given braking instant, a difference along the braking axis between the position of the aircraft and the predetermined position is above a threshold or when a given event occurs, updating in real time, by the calculator, of the sequence of use;

implementing the sequence of use of the braking system by the controller.

11. The method according to claim 10, wherein the sequence of use is implemented automatically.

12. The method according to claim 10, wherein the sequence of use is calculated in flight.

13. A non-transitory computer readable medium readable by a computer comprising instructions which, when executed by a computer, lead said computer to implement a method for controlling in real time a position of an aircraft on a braking axis of a runway on the ground implemented by a system for managing a deceleration of the aircraft on the runway enabling a control in real time of said position of the aircraft, the system including a braking system configured to brake the aircraft, a calculator and a controller configured to control the braking system, the method comprising:

calculating, by the calculator, from aircraft data and from external data comprising data on the state of the runway and meteorological data on the ground, a sequence of use of the braking system of the aircraft on the ground intended to brake the aircraft along the braking axis, over a predetermined braking distance associated with a predetermined braking duration comprising a plurality of braking instants each associated with a predetermined position on the braking axis, the sequence of use of the braking system being defined as an ordered series of use of the braking system between a landing point and a parking point of the aircraft, comprising activation/deactivation of the braking system and its characteristics of use;

when, at a given braking instant, a difference along the braking axis between the position of the aircraft and the predetermined position is above a threshold or when a given event occurs, updating in real time, by the calculator, of the sequence of use;

implementing the sequence of use of the braking system by the controller.

* * * * *